Dec. 12, 1939.   N. E. GEE   2,182,942
FLEXIBLE DRIVE
Original Filed Oct. 22, 1936
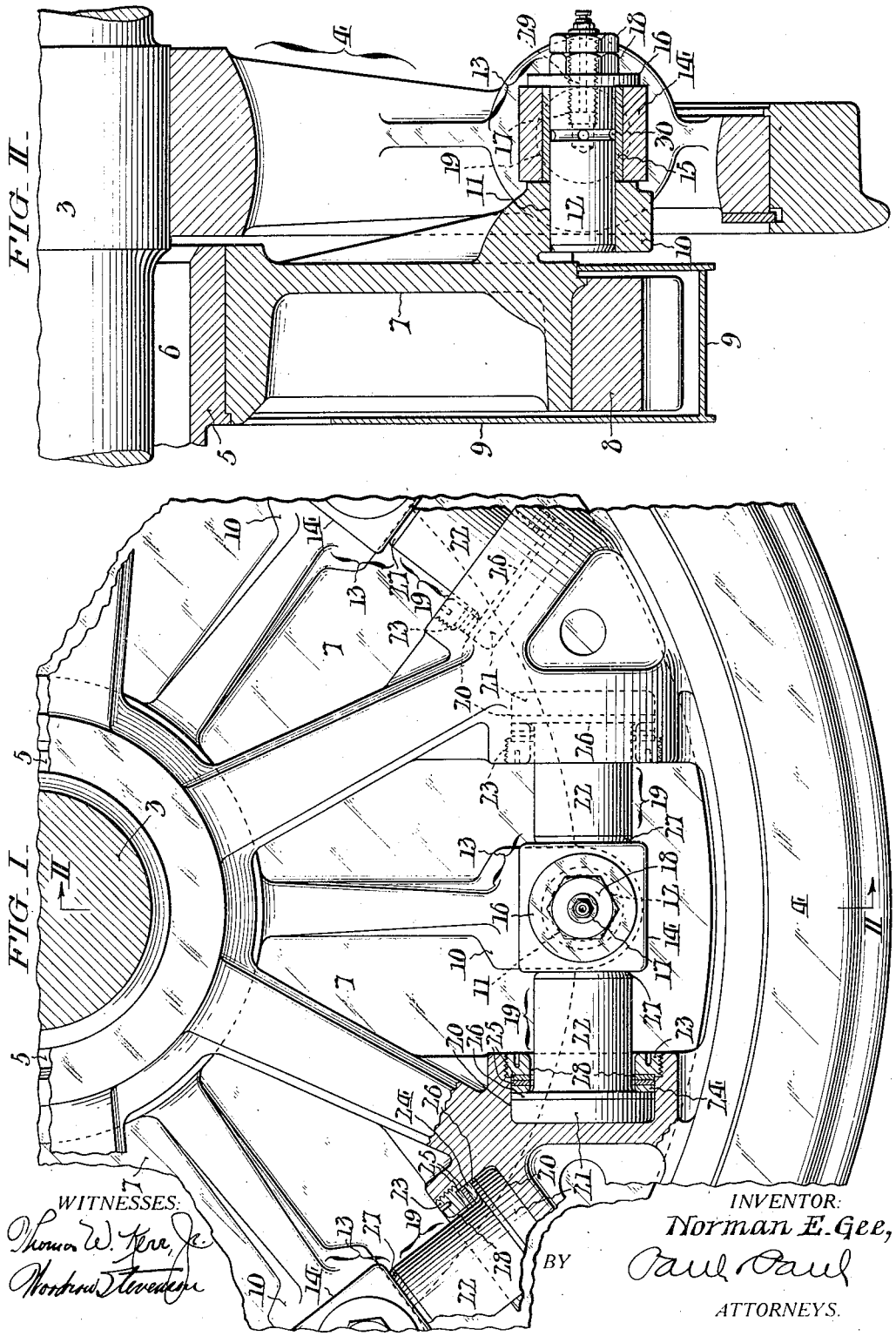
INVENTOR:
Norman E. Gee,
ATTORNEYS.

Patented Dec. 12, 1939

2,182,942

UNITED STATES PATENT OFFICE 2,182,942

FLEXIBLE DRIVE

Norman E. Gee, Narberth, Pa.

Original application October 22, 1936, Serial No. 107,023. Divided and this application February 6, 1939, Serial No. 254,752

8 Claims. (Cl. 64—27)

This invention relates to flexible drives and, preferably, to quill drives for electric locomotives for transmitting the torque of the motor to the locomotive driving wheels.

More specifically, the present subject matter is a division from my prior application for a patent, filed October 22, 1936, under Serial Number 107,-023, which has been allowed for passage to issue as a United States Patent on December 12, 1939. In this patent there is illustrated, described, and claimed broadly, certain combinations and arrangements of parts, whereas the instant case presents another arrangement, and I am herein claiming certain specific structural features coming under the broader claims of said prior patent.

The primary object of the present invention is to provide a flexible drive of the indicated type, characterized by means which positively ensure complete surface contact between the quill driving units and the coactive parts of the wheel driven thereby, in contradistinction to the known point or rolling contact of such parts.

Another object is the provision of an improved flexible drive in which wear between the coactive driving and driven surfaces is reduced to the minimum, and the motive thrust correspondingly spread over a larger area than heretofore.

A further object is the provision of an improved flexible drive preferably for electric locomotives which is simple in construction, readily and economically manufactured, easily assembled or adjusted, and very effective in operation.

Other objects and advantages of the particular arrangement of parts hereinafter disclosed will be apparent or referred to as the following description proceeds.

For a fuller understanding of the nature and scope of this invention reference is now had to the accompanying drawing.

Fig. I is a fragmentary side elevation of a locomotive driving gear center having the present improvements included therein; and, Fig. II is a cross section, taken approximately on the plane II—II of Fig. I.

This invention, although applicable to many types of drives, is preferably designed for electric locomotives, and no change is contemplated as regards the main driving means other than incorporating therewith the new flexible units between the driving gear and the locomotive driven wheels.

Referring more in detail to the drawing, a conventional driving axle is designated 3 with a locomotive driving wheel 4 secured thereon. Surrounding the axle 3 is a quill 5, which is driven from an electric motor, not shown, with sufficient clearance 6 intermediate said axle and quill to permit considerable relative movement. Upon the quill 5 is a gear center 7 having gears 8 at its periphery and being housed within a suitable case 9.

The gear center 7 is provided with a plurality of apertured projections 10, into the bores 11 whereof driving pins 12 are securely forced. Mounted upon each pin 12 is a connecting drive unit 13 preferably including a rectangular-section metal block 14, having a suitable bushing 15 trunnioned on said driving pin for rotation within predetermined limits as hereafter defined, or turning through an angle of ninety-degrees to present different active surfaces.

The block 14 and bushing 15 operate between the outer face of the associated projection 10 and a washer 16 on a suitably threaded pin 17 screwed into a corresponding axial bore in the driving pin 12, said washer being held in place by a plurality of nuts 18, whereby the drive unit 13 is maintained in rotative position on said driving pin.

The resilient means engaged by the drive units 13 comprise plug-shaped rubber elements 19 fitted within cavities 20 in the driving wheel 4; and each said element embodies a cylindrical base 21 and neck 22, the base being secured to the driving wheel 4 by means of a lock-ring 23 and spacing washers 24, 25, with the neck portion 22 projecting towards the drive units 13. Preferably each rubber element 19 has incorporated therewith a metal ring 26 which is vulcanized to the neck portion 22 and base 21; while a metal disc 27 may also be similarly fixed to the neck portion outer end; and it is to be noted the elements 19 limit the rotary movement of the drive units 13 about the drive pins 12, or their individual axis.

The rubber elements 19 are applied and maintained in position by forcing the spacing washers 24, 25 against the metal ring 26 incidental to tightening-up the lock 23. Furthermore, an annular space or clearance 28 is preferably provided between the plug neck portion 22, of each plug element 19, and the surrounding housing to give increased flexibility to said elements. Desirably, each securing or threaded pin 17 is provided with a bore 29, in communication with a circumferential groove 30 around the driving pin 12, through which lubricant may be supplied to the wearing surfaces between the bushing 15 and the drive pin 12.

The operation of the flexible drive as applied to an electric locomotive may be briefly explained as follows: Assuming that the "power" is on, it will be readily seen that when the torque is applied to the gear center 7, the connecting drive unit blocks 14 engaging the resilient plug-shaped elements 19 with compressive surface contact will, incidental to pivotal mounting thereof on the driving pins 12, impart directly effective rotary movement to the locomotive driving wheel 4, and concurrently release the opposing elements 19 from contacting said blocks. Obviously, when the current in the motor fields is reversed, the direction of rotation of the gear center 7 and road wheel 4 will be correspondingly changed, and the opposing active face of the blocks 14 coact with the confronting plug neck portions 22. The plugs 19 being made of rubber with a surrounding clearance 28 relieve the associated operative parts of undue shocks; and also accommodate the necessary deflections due to rough railroad tracks and inaccurate concentric alignment between the quill 5 and the driving axle 3. Furthermore, by employing drive units 13 of the type described, in conjunction with the rubber plug elements 19, a means is provided for considerably reducing the factor of wear at the critical points where said units engage the wheel plug elements 19.

Having thus described my invention, I claim:

1. In combination with a drive member and a driven member which rotate in unison with each other, rotatable rectangular section units positioned on the drive member, and resilient units interlocked with and carried by the driven member, said first mentioned units having surface contact with the resilient units during revolution of the driven member.

2. In combination with a driving member and a driven member, a drive unit for transmitting torque from the former to the latter comprising a rectangular block member revolvable bodily with said driving member and rotatable about its own axis, and said block member engaging resilient plugs socketed in the driven member with substantial surface contact.

3. In combination with a driving member and a driven member, a drive unit for transmitting torque from the former to the latter, comprising a rectangular section block having a pivotal axis and revolvable bodily with the driving member, as well as rotatable on its own axis, said block having a plurality of smooth contact surfaces, and any one of which may coact with the confronting face of resilient means interlocked with the driven member.

4. In combination with a driving member and a driven member, a drive unit for transmitting torque from the former to the latter, comprising a rectangular section block having a pivotal axis and revolvable bodily with the driving member as well as rotatable on its own axis, and said block having a smooth surface contact with the confronting face of resilient means interlocked with the driven member.

5. In combination with a driving member and a driven member, a rectangular-section drive unit pivotally carried by the driving member for transmitting torque therefrom to the driven member, said unit being revolvable bodily with the driving member and rotatable on its pivot, and resilient means interlocked in the driven member and adapted to engage opposite faces of the drive unit, said resilient means being in the form of rubber plug elements projecting towards the drive unit.

6. The combination of claim 5, wherein each rubber plug element embodies a cylindrical base and a relatively reduced neck, and a metal ring and metal disc are respectively vulcanized to the annular face of the base and the free end of the neck respectively.

7. In combination with a drive member and a driven member which rotate either eccentric or concentric to each other, rotatable rectangular section units positioned on the drive member and rotatable resilient units interlocked with and carried by the driven member, said first mentioned units having a plurality of contact surfaces for coacting with the resilient units during revolution of the driven member.

8. In combination with a drive member and a driven member which rotate either concentric or eccentric to each other, rotatable units positioned on the drive member and resilient units carried by the driven member, a housing interlocked with and carried by the driven member, into which the resilient unit is compressed under load and an annular space between said resilient unit and the housing.

NORMAN E. GEE.